(12) United States Patent
Furuta et al.

(10) Patent No.: US 9,134,708 B2
(45) Date of Patent: Sep. 15, 2015

(54) INFORMATION PROCESSING DEVICE AND POWER USE ADJUSTMENT SYSTEM

(71) Applicants: Kenichiro Furuta, Tokyo (JP); Yuichi Komano, Kanagawa (JP); Shinji Yamanaka, Tokyo (JP); Satoshi Ito, Tokyo (JP); Hideyuki Aisu, Kanagawa (JP); Tomoshi Otsuki, Kanagawa (JP); Masatake Sakuma, Tokyo (JP); Taichi Isogai, Tokyo (JP)

(72) Inventors: Kenichiro Furuta, Tokyo (JP); Yuichi Komano, Kanagawa (JP); Shinji Yamanaka, Tokyo (JP); Satoshi Ito, Tokyo (JP); Hideyuki Aisu, Kanagawa (JP); Tomoshi Otsuki, Kanagawa (JP); Masatake Sakuma, Tokyo (JP); Taichi Isogai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 291 days.

(21) Appl. No.: 13/728,363

(22) Filed: Dec. 27, 2012

(65) Prior Publication Data

US 2013/0166080 A1    Jun. 27, 2013

(30) Foreign Application Priority Data

Dec. 27, 2011    (JP) ................................. 2011-285411

(51) Int. Cl.
*G05B 13/02*    (2006.01)
*H04L 9/00*    (2006.01)
*G05B 15/02*    (2006.01)

(52) U.S. Cl.
CPC ................ *G05B 13/02* (2013.01); *G05B 15/02* (2013.01); *H04L 9/008* (2013.01); *G05B 2219/2642* (2013.01)

(58) Field of Classification Search
None
See application file for complete search history.

(56) References Cited

U.S. PATENT DOCUMENTS 7,590,472 B2 *    9/2009    Hakim et al. ................. 700/295
2011/0106328 A1 *    5/2011    Zhou et al. .................... 700/291
2013/0262863 A1 *    10/2013    Yoshino et al. ............... 713/165

OTHER PUBLICATIONS

Matsuyama, R., IPSJ (Information Processing Society of Japan) Magazine, vol. 5, No. 8, pp. 926-933, (2010).

\* cited by examiner

*Primary Examiner* — Kenneth M Lo
*Assistant Examiner* — Geoffrey Wellman
(74) *Attorney, Agent, or Firm* — Nixon & Vanderhye, P.C.

(57) ABSTRACT

An example information processing device includes first and second receiving units, a deciding unit, and first and second transmitting units. The first receiving unit receives adjustment limit information from a plurality of first external devices. The deciding unit determines adjustment rules on the basis of the adjustment limit information. The first transmitting unit transmits the adjustment rules to second and third external devices. The second receiving unit receives determination information from a fourth external device. The second transmitting unit transmits the adjustment rules to the first external devices when integrated schedule information satisfies a condition. When the integrated schedule information does not satisfy the condition, the deciding unit changes the adjustment rules. When the deciding unit has changed the adjustment rules, the first transmitting unit transmits new adjustment rules to the second and third external devices.

9 Claims, 10 Drawing Sheets

INFORMATION PROCESSING DEVICE AND POWER USE ADJUSTMENT SYSTEM

CROSS-REFERENCE TO RELATED APPLICATION(S)

This application is based upon and claims the benefit of priority from Japanese Patent Application No. 2011-285411, filed on Dec. 27, 2011; the entire contents of which are incorporated herein by reference.

FIELD

Embodiments described herein relate generally to an information processing device and a power use adjustment system.

BACKGROUND

A next-generation energy supply system called smart grid is a mechanism to realize more stable supply of power while attempting to effectively use renewable energy by controlling demand and supply balance of power using information network technologies. Since power generation utilizing renewable energy such as solar power generation and wind power generation has large power fluctuation due to meteorological conditions, it is required to control demand and supply for accommodating the power fluctuation by other controllable power supplies, batteries or adjusting power demand. A technology called demand, response is known as an approach in demand of such control on demand and supply.

The demand response is to limit power use at the user side on the basis of requests from utility companies for the purposes of curbing peak demand when energy demands rise, load leveling by shifting demands to light-load periods, and suppressing short-term fluctuation when a great deal of renewable energy is introduced. Various methods can be considered for realizing the demand response. Examples thereof include a method of collecting information on power use schedules of users under electricity supply contracts by a server managed by a utility company, estimating the total amount of power consumption assumed in the future to make adjustments to meet the purpose of the demand response described above, and requesting some users to change the power use schedules.

If the information collected by the server is stolen without authorization when the demand response is realized in such a method, the life pattern or the like of a user can be inferred from the information, which leads to privacy invasion.

DETAILED DESCRIPTION

Figure 1:
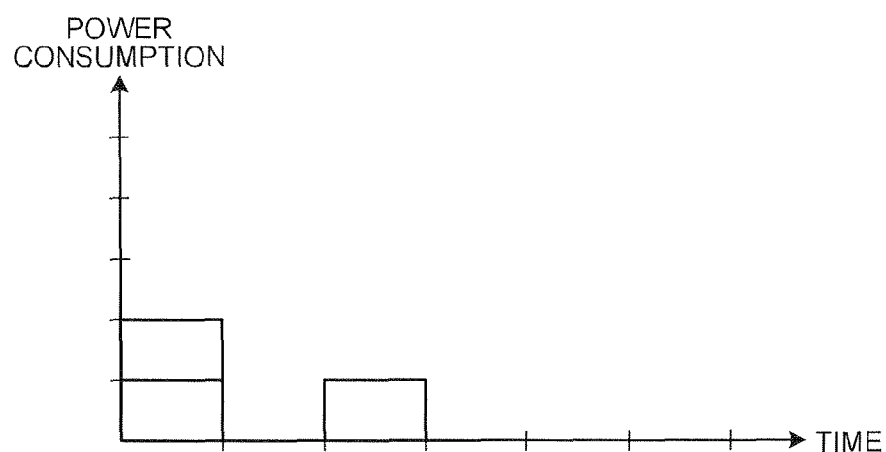
FIG. 1 is an explanatory graph explaining an example of schedule information.

According to an embodiment, an information processing device is connected to a plurality of first external devices, a second external device, a third external device and a fourth external device. The first external devices store therein schedule information pieces of power use of respective users, transmit converted information pieces obtained by converting the schedule information pieces to the second external device, and transmit difference information pieces that are differences between the converted information pieces and the schedule information pieces to the third external device. The second external device transmits integrated converted information that is a sum of a plurality of converted information pieces adjusted according to a plurality of adjustment rules, respectively, to the fourth external device. The third external device transmits integrated difference information that is a sum of a plurality of difference information pieces adjusted according to the adjustment rules, respectively, to the fourth external device. The fourth external device determines whether or not integrated schedule information that is a difference between the integrated converted information and the integrated difference information satisfies a predetermined condition. The information processing device includes a first receiving unit, a deciding unit, a first transmitting unit, a second receiving unit, and a second transmitting unit. The first receiving unit is configured to receive, from each of the first external devices, adjustment limit information representing a range within which the schedule information can be adjusted. The deciding unit is configured to determine the adjustment rules to be individually applied to the schedule information pieces on a basis of the adjustment limit information. The first transmitting unit is configured to transmit the adjustment rules to the second external device and the third external device. The second receiving unit is configured to receive determination information representing a result of the determination from the fourth external device. The second transmitting unit is configured to transmit the adjustment rules, which have been transmitted to the second external device and the third external device, to the first external devices upon receipt of the determination information indicating that the integrated schedule information satisfies the condition. The deciding unit changes at least one of the adjustment rules upon receipt of the determination information indicating that the integrated schedule information does not satisfy the condition. When the deciding unit has changed at least one of the adjustment rules, the first transmitting unit transmits new adjustment rules including the changed adjustment rule to the second external device and the third external device.

Outline of Power Use Adjustment System

First, an outline of a power use adjustment system according to an embodiment will be described. The power use adjustment system according to the embodiment is a system that realizes the demand response by requesting users under contract with a utility company offering business relating to electricity supply to accept limitation of electricity use and providing the users with incentives to conform to the requests by the utility company.

The power use adjustment system according to the embodiment is used by a plurality of users under contracts with the utility company. The users directly use user's servers. A user's server is provided for each user and stores schedule information representing power consumption per time slot scheduled by the user. When a user uses the power use adjustment system, a user's server associated with the user transmits schedule information to a server (hereinafter referred to as power use adjustment server) managed by the utility company.

The power use adjustment server collects schedule information from respective user's servers, adjusts (arranges) at least part of the schedule information so that loads on equipment supplying electricity is reduced, and transmits adjustment information representing a result of the adjustment to the user's servers that are sources of the schedule information subjected to the adjustment. The adjustment information transmitted to the user's servers by the power use adjustment server contains information requesting to change power use time so that power consumption scheduled at a certain time slot will be shifted to another time slot.

FIG. 1 is an explanatory graph explaining an example of the schedule information to be transmitted from a user's server to the power use adjustment server in the power use adjustment system according to the embodiment. An example of the schedule information is information representing power consumption per unit time in a form of a graph as illustrated in FIG. 1. The horizontal axis in FIG. 1 represents time in time frames representing time slots and the vertical axis therein represents power consumption in each time frame. The schedule information illustrated in FIG. 1 shows that power corresponding to the number of rectangular blocks in each time frame is scheduled to be used. For the starting point of the schedule information (the starting point of the horizontal axis in FIG. 1), the size of a time frame, the number of time frames, the amount of electric power corresponding to one block, and a timing at which the schedule information is to be transmitted, general rules in the power user adjustment system may be determined in advance. The rules may also be changed as needed at predetermined intervals such as every month or every season. Each user's server transmits schedule information for a predetermined period at a predetermined timing according to the rules mentioned above.

The power use adjustment server integrates the pieces of schedule information collected from a plurality of user's servers to obtain a sum of power consumption per each time frame. The power use adjustment server also acquires supply capability information representing distribution of electric power amount that can be supplied at each time slot from a grid monitoring and control device that monitors and controls power supply equipment, for example. If there is a time frame in which the sum of power consumption exceeds the electric power amount that can be supplied or a time frame in which the sum of power consumption is largely different from a target value set for each time frame, part of power consumption scheduled at the time frame is shifted to another time frame by adjusting at least part of the schedule information so that loads on power supply equipment are reduced. The power use adjustment server then transmits adjustment information representing a result of the adjustment to the user's servers that are sources of the schedule information subjected to the adjustment to request to accept the adjustment result.

The power use adjustment system according to the embodiment has the following unprecedented features. While users are only requested to limit power use at a certain time slot with a conventional system realizing the demand response, users are requested to complementarily adjust power use at a plurality of time points with the power use adjustment system according to the embodiment. In other words, the power use adjustment system according to the embodiment is a system that compensates for electric power amount corresponding to limited power use of users at a certain time slot with power supply at another time slot.

Specifically, when the power use adjustment server adjusts schedule information transmitted from a certain user's server to reduce power consumption at a certain time frame by 50 W, for example, the power use adjustment server also makes an adjustment to increase power consumption at another time frame by 50 W at the same time. The power use adjustment server thus makes an adjustment to shift power consumption of 50 W at a certain time frame to another time frame. The power use adjustment server then transmits, to the user's server that transmitted the schedule information, adjustment information containing a request to accept the adjustment to shift the power consumption of 50 W at a certain time frame to another time frame. The compensation of power consumption at another time frame need not necessarily be a complete compensation but may be a compensation of part of the power consumption limited at a certain time frame at another time frame.

Users under contract with a utility company are provided with incentives as a result of accepting the adjustment result from the power use adjustment server, and will thus accept the adjustment result in many cases. Various methods for providing the users with incentives can be considered, and an incentive of lowering the electricity rate is assumed in the embodiment.

Figure 2:
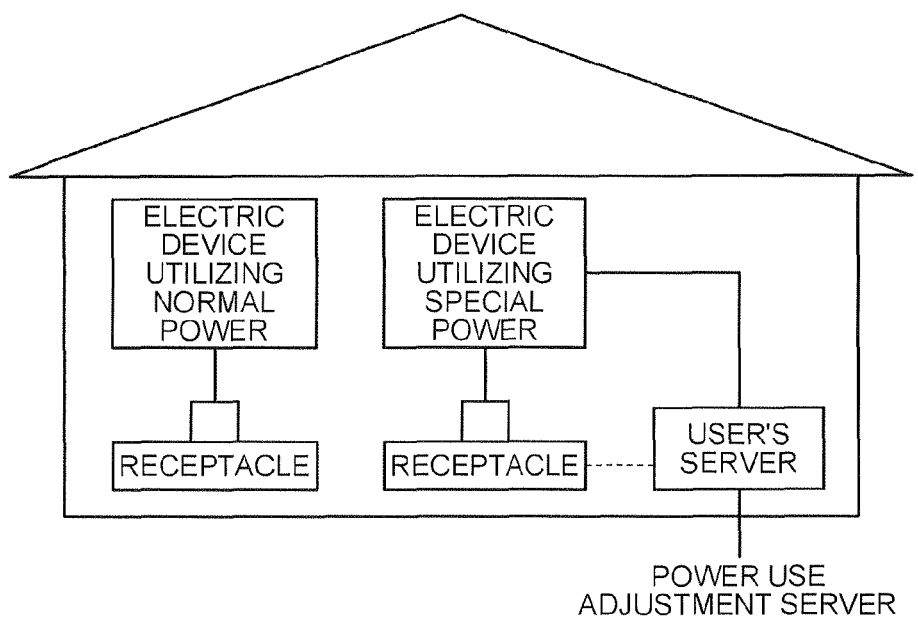
FIG. 2 is a conceptual diagram schematically illustrating a power use situation.

FIG. 2 is a conceptual diagram schematically illustrating a power use situation assumed in the embodiment. The users under contract with the utility company are supplied with two types of electricity, which are normal power and special power. Normal power is power supplied when an electric device is plugged into a receptacle without requiring any special procedure. Special power, on the other hand, is power supplied when an electric device is connected to a user's server and then plugged into a receptacle or power supplied when an electric device is plugged into a receptacle that is connected to a user's server.

The rate of the special power is lower than the normal Power but the use thereof is limited according to requests from the power use adjustment server. In other words, power whose supply is limited by a user's server according to adjustment information transmitted from the power use adjustment server is the special power. When the special power is used, the convenience is lower than a case where the normal power is used. The special power can be used at a low rate in compensation for such low convenience. Alternatively, a method of lowering the price of an electric device utilizing the special power, for example can be considered instead of lowering the rate of the special power with limited use as described above.

The power use adjustment server can perform shift adjustment or interval adjustment of power consumption on schedule information transmitted from the user's servers within an extension ratio (contract ratio) or an extension range (contract range) determined by contracts. The shift adjustment is a method for adjustment by shifting power consumption scheduled at a certain time frame to another time frame. The interval adjustment is a method for adjustment by inserting a time frame at which power consumption is zero between two time frames. The extension ratio and the extension range are indices of a shifted amount of power consumption in schedule information, where an extension ratio n means that the power consumption at a time frame k can be shifted up to a time frame k×n, and an extension range n means that the power consumption at a time frame k can be shifted up to a time frame k+n.

Figure 3A:
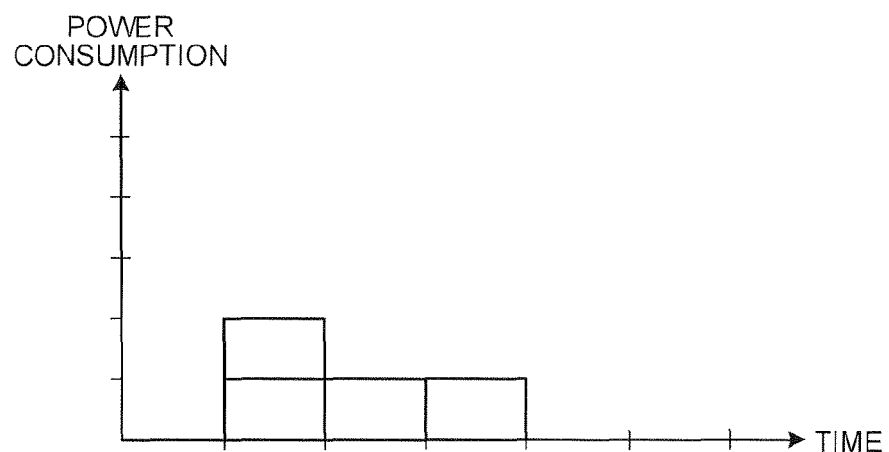
FIGS. 3A and 3B are explanatory graphs explaining a shift adjustment and an interval adjustment, respectively.
Figure 3B:
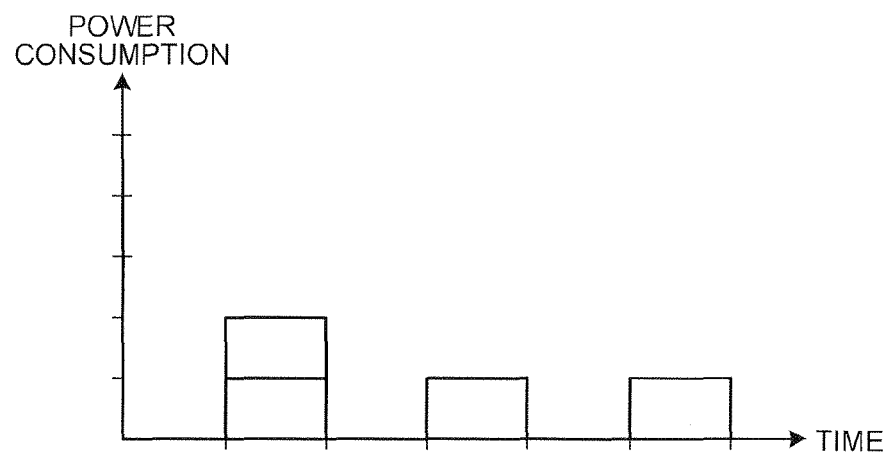

For example, a shift by 1 to the right in the schedule information illustrated in FIG. 1 results in an adjustment result illustrated in FIG. 3A. Alternatively, an interval increase by 1 in the schedule information illustrated in FIG. 1 results in an adjustment result illustrated in FIG. 33. The power use adjustment server determines an adjustment rule to be applied to the schedule information using either the shift adjustment or the interval adjustment described above or the combination of the both within the extension ratio (contract ratio) or the extension range (contract range) defined by contract with users, and adjusts the schedule information according to the adjustment rule. Typically, the rate of the special power is set according to the extension ratio or the extension range and becomes lower as the extension ratio or the extension range is higher. The extension ratio or the extension range can be increased up to the contract ratio or the contract range.

Necessity of Privacy Protection

As described above, in the power use adjustment system according to the embodiment, the power use adjustment server collects and adjusts schedule information from a plurality of user's servers. Note that the schedule information collected by the power use adjustment server is information from which the life patterns or the like of users can be inferred, and if the schedule information itself could leak out as a result of an attack to the power use adjustment server or the like, this leads to invasion of the users' privacy. To address such a problem, the power use adjustment system according to the embodiment employs a mechanism to protect privacy of the users by preventing the schedule information itself from leaking out from the power use adjustment server even if the power use adjustment server is attacked.

The mechanism will be briefly described as follows. First, the power use adjustment server has four separate functions, and the respective separate functions are distributed to four servers that are physically independent. Each user's management server transmits converted information obtained by converting the schedule information and different information that is a difference between the converted information and the original schedule information to two of the four servers. Each user's server converts the schedule information by encryption using a mask, for example. In the following, the converted information obtained as a result of converting the schedule information by encryption using a mask will be referred to as cipher information, and the difference information that is a difference between the cipher information and the original schedule information will be referred to as mask information. A server that receives the cipher information from each user's server will be referred to as a cipher server and a server that receives the mask information from each user's server will be referred to as a mask server.

In addition, one of the four servers mentioned above has a function of determining a plurality of adjustment rules to be individually applied to the schedule information of each user utilizing the power use adjustment system. Furthermore, one of the four servers mentioned above has a function of determining whether or not integrated schedule information obtained by integrating a plurality of pieces of adjusted schedule information satisfies a predetermined control condition set on the basis of the supply capability information described above or the like. In the following, the server having the function of determining the adjustment rules will be referred to as a rule server and the server having the function of determining whether or not integrated schedule information satisfies a control condition will be referred to as a determination server.

The rule server transmits a plurality of adjustment rules respectively corresponding to a plurality of pieces of schedule information to the cipher server and the mask server. The cipher server applies individual adjustment rules to the respective pieces of cipher information received from a plurality of user's servers, and transmits integrated cipher information that is a sum of adjusted cipher information pieces to the determination server. The mask server applies individual adjustment rules to the respective pieces of mask information received from a plurality of user's servers, and transmits integrated mask information that is a sum of adjusted mask information pieces to the determination server. Note that the same adjustment rule for one schedule information piece is applied to a cipher information piece and a mask information piece that are generated from the schedule information piece. The determination server generates integrated schedule information (corresponding to information obtained by integrating a plurality of schedule information pieces to which individual adjustment rules are applied) that is a difference between the integrated cipher information received from the cipher server and the integrated mask information received from the mask server, determines whether or not the generated integrated schedule information satisfies a predetermined control condition, and transmits determination information representing a result of the determination to the rule server.

If the determination information from the determination server is a negative determination (if the integrated schedule information does not satisfy the control condition), the rule server changes at least one of a plurality of adjustment rules and transmits new adjustment rules including the changed adjustment rule to the cipher server and the mask server. As a result, the processes at the cipher server, the mask server and the determination server based on the new adjustment rules are repeated. If the determination information from the determination server is a positive determination (if the integrated schedule information satisfies the control condition), on the other hand, the rule server transmits the adjustment rules respectively applied to the plurality of schedule information pieces (the adjustment rules that are finally transmitted to the cipher server and the mask server) as the adjustment information to the respective associated user's servers. Each user's server that has received the adjustment information controls the supply of the special power according to the received adjustment information. A specific example of the power use adjustment system according to the embodiment will be described in more detail below focusing on the mechanism for privacy protection.

Specific Example of Configuration of Power Use Adjustment System

Figure 4:
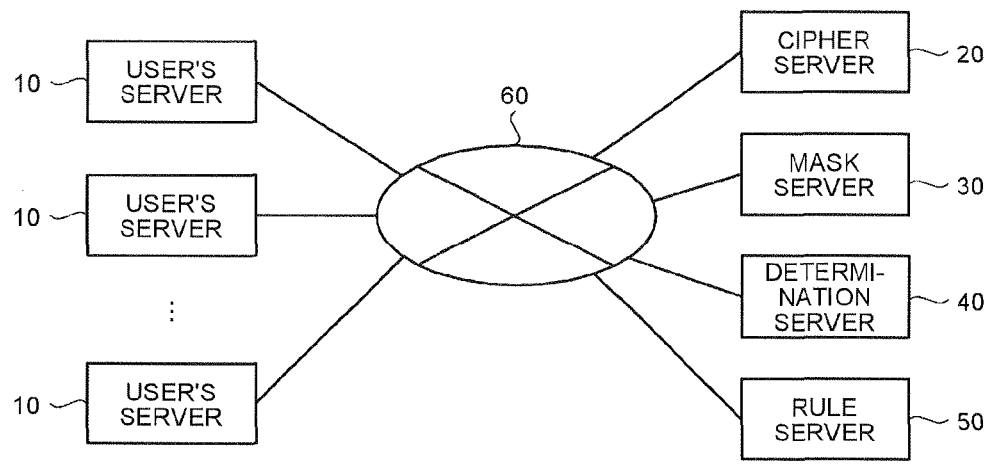
FIG. 4 is a configuration diagram illustrating an example of a power use adjustment system according to an embodiment.

FIG. 4 is a configuration diagram illustrating an exemplary configuration of a power use adjustment system according to the embodiment. The power use adjustment system according to the embodiment has a configuration in which a plurality of user's servers 10, a cipher server 20, a mask server 30, a determination server 40 and a rule server 50 are connected via a communication network 60 in a manner capable of communication with one another as illustrated in FIG. 4. The communication network 60 is, for example, a local area network (LAN), an intranet, an Ethernet (registered trademark), the Internet or the like.

The cipher server 20, the mask server 30, the determination server 40 and the rule server 50 each include a control unit such as a central processing unit (CPU) configured to control the entire device and perform basic operation, a main storage unit such as a random access memory (RAM), an auxiliary storage unit such as a read only memory (RCM), a hard disk drive (HDD) and a compact disc (CD) drive configured to store various data and various programs, and a bus that connects these units, which is a hardware configuration using a common computer system. The cipher server 20, the mask server 30, the determination server 40 and the rule server 50 each further include a communication interface (I/F) for communication via the communication network 60.

The user's servers 10 each include a control unit such as a central processing unit (CPU) configured to control the entire device, a main storage unit such as a random access memory (RAM), an auxiliary storage unit such as a read only memory (ROM) and a nonvolatile memory configured to store various data and various programs, and a bus that connects these units, which is a configuration similar to that of a dedicated hardware or an embedded system. The user's servers 10 each further include a communication interface (I/F) for communication via the communication network 60. In addition, the user's servers 10 are each connected with a display device configured to display various information and an input device such as operation buttons and a key board to which operation by a user is input.

Figure 5:
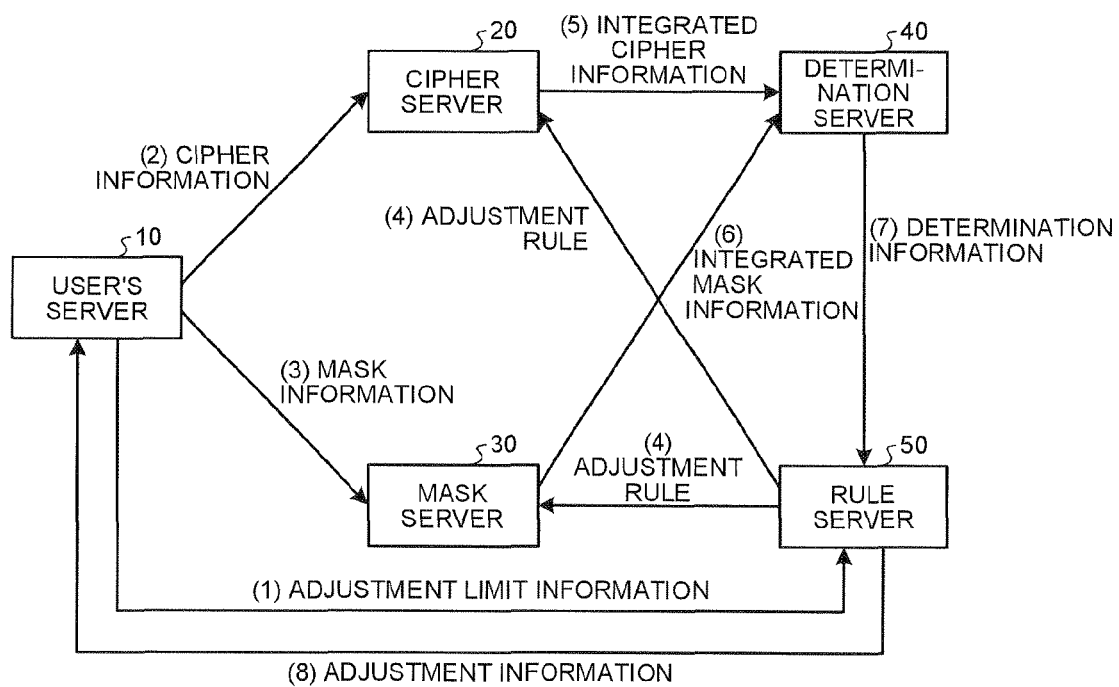
FIG. 5 is an explanatory diagram explaining a flow of information in the power use adjustment system according to the embodiment.

FIG. 5 is an explanatory diagram explaining a flow of information in the power use adjustment system according to the embodiment. Although only one user's server 10 is illustrated as a representative in FIG. 5 for simplification of the drawing, a plurality of user's servers 10 are actually present and each of the user's server 10 performs information exchange as illustrated in FIG. 5.

In the power use adjustment system according to the embodiment, information is transmitted/received between servers in the following order of (1) to (8), for example.

(1) Adjustment limit information (information on the contract ratio or the contract range as described above) representing a range within which schedule information stored in each user's server 10 can be adjusted is transmitted from each of a plurality of user's server 10 to the rule server 50.
(2) Cipher information is transmitted from each of the user's servers 10 to the cipher server 20.
(3) Mask information is transmitted from each of the user's servers 10 to the mask server 30.
(4) A plurality of adjustment rules is transmitted from the rule server 50 to the cipher server 20 and the mask server 30.
(5) Integrated cipher information is transmitted from the cipher server 20 to the determination server 40.
(6) Integrated mask information is transmitted from the mask server 30 to the determination server 40.
(7) Determination information representing a result determination as to whether or not the integrated schedule information satisfies a control condition is transmitted from the determination server 40 to the rule server 50. If determination information indicating that the integrated schedule information does not satisfy the control condition is transmitted, (4) to (7) are repeated, and if determination information indicating that the integrated schedule information satisfies the control condition, the processing proceeds to (8).
(8) Adjustment information representing a result of the adjustment on the schedule information is transmitted from the rule server 50 to the user's servers 10. The adjustment information transmitted to the user's servers 10 is the adjustment rules transmitted to the cipher server 20 and the mask server 30 in (4).

The adjustment limit information in (1) need not necessarily be transmitted from the user's servers 10 to the rule server 50 each time the use information is adjusted in the power use adjustment system, but the power use adjustment system may be configured such that adjustment limit information is transmitted from a user's server 10 newly joining the power use adjustment system to the rule server 50 and the rule server 50 stores the adjustment limit information for each user's server 10.

The order of (2) to (4) may be changed, and the order of (5) and (6) may be changed.

Although the determination information is sent from the determination server 40 only to the rule server 50 in (7) described above, the determination information indicating that the integrated schedule information does not satisfy the control condition may also be transmitted to the cipher server 20 and the mask server 30 when the integrated schedule information does not satisfy the control condition. In this case, the cipher server 20 and the mask server 30 can carry out preprocessing for applying new adjustment rules to cipher information and mask information before the new adjustment rules are transmitted from the rule server 50, which can accelerate the processing.

Figure 6:
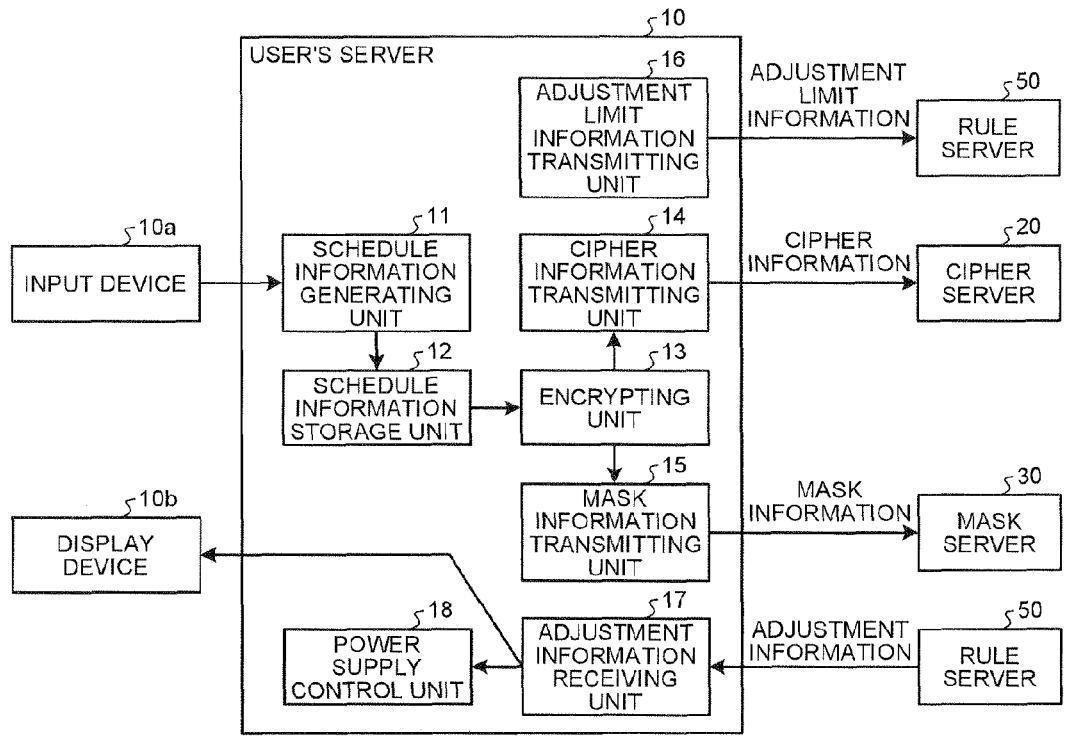
FIG. 6 is a functional block diagram of a user's server according to the embodiment.

FIG. 6 is a functional block diagram illustrating an example of a functional configuration implemented in a user's server 10. The user's server 10 includes a schedule information generating unit 11, a schedule information storage unit 12, an encrypting unit 13, a cipher information transmitting unit 14, a mask information transmitting unit 15, an adjustment limit information transmitting unit 16, an adjustment information receiving unit 17 and a power supply control unit 18 as illustrated in FIG. 6. In addition, the user's server 10 is connected with an input device 10a and a display device 10b.

Functions of the schedule information generating unit 11, the schedule information storage unit 12, the encrypting unit 13 and the power supply control unit 18 are implemented by executing programs stored in the auxiliary storage unit by the CPU using the main storage unit, for example. Functions of the cipher information transmitting unit 14, the mask information transmitting unit 15, the adjustment limit information transmitting unit 16 and the adjustment information receiving unit 17 are implemented by controlling the operation of the communication interfaces by executing programs stored in the auxiliary storage unit by the CPU using the main storage unit, for example.

The schedule information generating unit 11 generates schedule information (information in which the power consumption per time frame is expressed in a form of a graph as illustrated in FIG. 1) representing the power consumption per time slot scheduled by a user according to an operation input using the input device 10a by the user. While a case in which the user directly inputs a schedule of power consumption by using the input device 10a is assumed here, the schedule information may alternatively be generated by storing a record of actual power consumption per time slot in the past as history data and predicting future power consumption on the basis of the history data.

The schedule information storage unit 12 stores the schedule information generated by the schedule information generating unit 11.

The encrypting unit 13 encrypts the schedule information stored by the schedule information storage unit 12 to generate cipher information. The cipher information generated by the encrypting unit 13 is information obtained by converting the original schedule information by information (mask information) functioning as a mask. The mask information represents a difference between the cipher information and the original schedule information, and the original schedule information can be restored by obtaining a difference between the cipher information and the mask information. Examples of the encryption by the encrypting unit 13 include encryption using additive homomorphic function as will be described later.

The cipher information transmitting unit 14 transmits the cipher information generated by the encrypting unit 13 to the cipher server 20 via the communication network 60. In this process, the cipher information transmitting unit 14 preferably transmits information for identifying the cipher information received at the cipher server 20 such as information unique to the user's server 10 together with the cipher information to the cipher server 20.

The mask information transmitting unit 15 transmits the mask information that is a difference between the cipher information generated by the encrypting unit 13 and the original schedule information to the mask server 30 via the communication network 60. In this process, the mask information transmitting unit 15 preferably transmits information for identifying the mask information received at the mask server 30 such as information unique to the user's server 10 together with the mask information to the mask server 30.

The adjustment limit information transmitting unit 16 transmits information on the contract ratio or the contract range defined by a contract as the adjustment limit information representing a range within which the schedule information can be adjusted to the rule server 50 via the communication network 60. In this process, the adjustment limit information transmitting unit 16 preferably transmits information for identifying the adjustment limit information received at the rule server 50 such as information unique to the user's server 10 together with the adjustment limit information to the rule server 50.

The adjustment information receiving unit 17 receives adjustment information transmitted from the rule server 50 via the communication network 60. The adjustment information transmitted from the rule server 50 represents adjustment rules applied to the schedule information stored by the schedule information storage unit 12 as described above, and contains information requesting to change the power use time so as to shift power consumption scheduled at a certain time frame to another time frame.

The power supply control unit 18 controls supply of the special power described above according to the adjustment information received by the adjustment information receiving unit 17. In this process, it is preferable that the adjusted schedule information be displayed on the display device 10b in a form of a graph so that the user can recognize how the original schedule information is adjusted.

Figure 7:
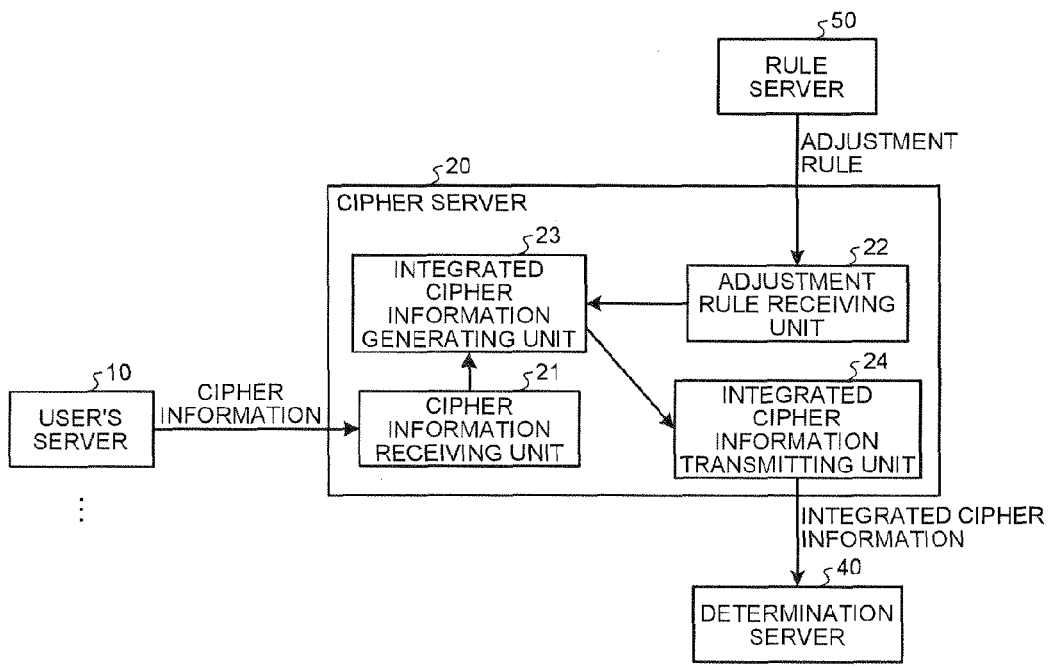
FIG. 7 is a functional block diagram of a cipher server according to the embodiment.

FIG. 7 is a functional block diagram illustrating an example of a functional configuration implemented in the cipher server 20. The cipher server 20 includes a cipher information receiving unit 21, an adjustment rule receiving unit 22, an integrated cipher information generating unit 23 and an integrated cipher information transmitting unit 24 as illustrated in FIG. 7.

Functions of the integrated cipher information generating unit 23 are implemented by executing programs stored in the auxiliary storage unit by the CPU using the main storage unit, for example. Functions of the cipher information receiving unit 21, the adjustment rule receiving unit 22 and the integrated cipher information transmitting unit 24 are implemented controlling the operation of the communication interfaces by executing programs stored in the auxiliary storage unit by the CPU using the main storage unit, for example.

The cipher information receiving unit 21 receives each of cipher information pieces transmitted from a plurality of user's server 10 via the communication network 60.

The adjustment rule receiving unit 22 receives a plurality of adjustment rules transmitted from the rule server 50 via the communication network 60. The adjustment rules received by the adjustment rule receiving unit 22 are respectively associated with the cipher information pieces received by the cipher information receiving unit 21 from the user's servers 10.

The integrated cipher information generating unit 23 applies each of the adjustment rules received by the adjustment rule receiving unit 22 to each of the cipher information pieces received by the cipher information receiving unit 21, and integrates the adjusted cipher information pieces to generate integrated cipher information that is a sum of the adjusted cipher information pieces.

The integrated cipher information transmitting unit 24 transmits the integrated cipher information generated by the integrated cipher information generating unit 23 to the determination server 40 via the communication network 60.

Figure 8:
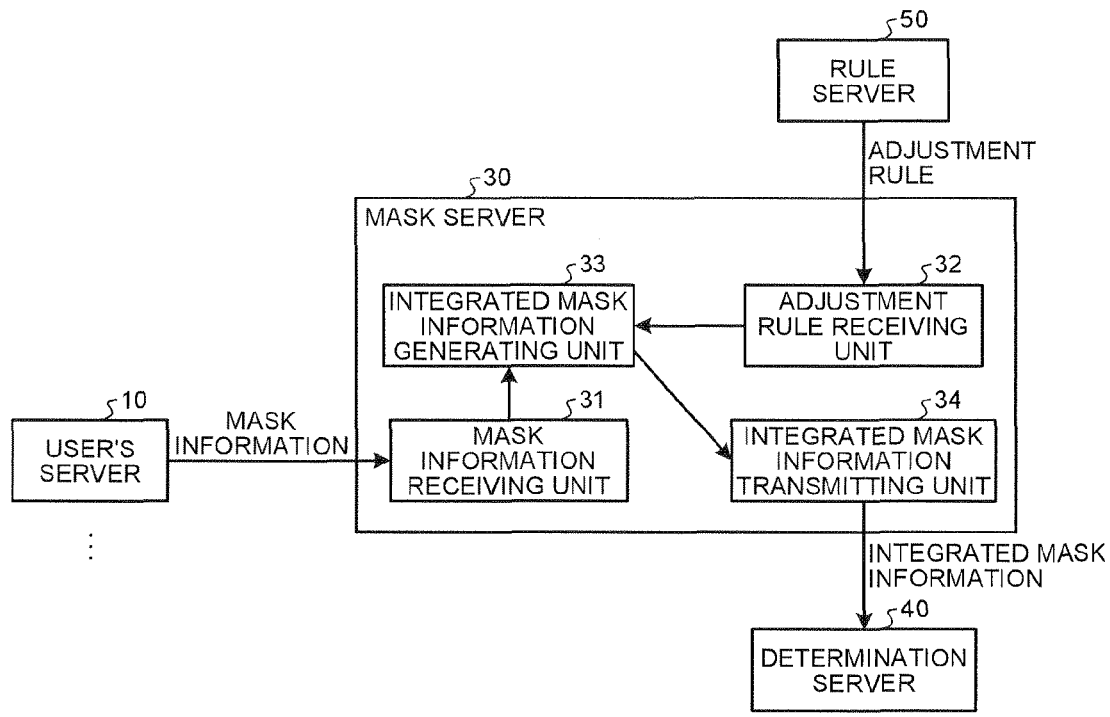
FIG. 8 is a functional block diagram of a mask server according to the embodiment.

FIG. 8 is a functional block diagram illustrating an example of a functional configuration implemented in the mask server 30. The mask server 30 includes a mask information receiving unit 31, an adjustment rule receiving unit 32, an integrated mask information generating unit 33 and an integrated mask information transmitting unit 34 as illustrated in FIG. 8.

Functions of the integrated mask information generating unit 33 are implemented by executing programs stored in the auxiliary storage unit by the CPU using the main storage unit, for example. Functions of the mask information receiving unit 31, the adjustment rule receiving unit 32 and the integrated mask information transmitting unit 34 are implemented controlling the operation of the communication interfaces by executing programs stored in the auxiliary storage unit by the CPU using the main storage unit, for example.

The mask information receiving unit 31 receives each of mask information pieces transmitted from a plurality of user's server 10 via the communication network 60.

The adjustment rule receiving unit 32 receives a plurality of adjustment rules transmitted from the rule server 50 via the communication network 60. The adjustment rules received by the adjustment rule receiving unit 32 are respectively associated with the mask information pieces received by the mask information receiving unit 31 from the user's servers 10.

The integrated mask information generating unit 33 applies each of the adjustment rules received by the adjustment rule receiving unit 32 to each of the mask information pieces received by the mask information receiving unit 31, and integrates the adjusted mask information pieces to generate integrated mask information that is a sum of the adjusted mask information pieces. Note that the adjustment rules applied to the individual mask information pieces as the same as the adjustment rules applied to the respective cipher information pieces associated with the respective mask information pieces.

The integrated mask information transmitting unit 34 transmits the integrated mask information generated by the integrated mask information generating unit 33 to the determination server 40 via the communication network 60.

Figure 9:
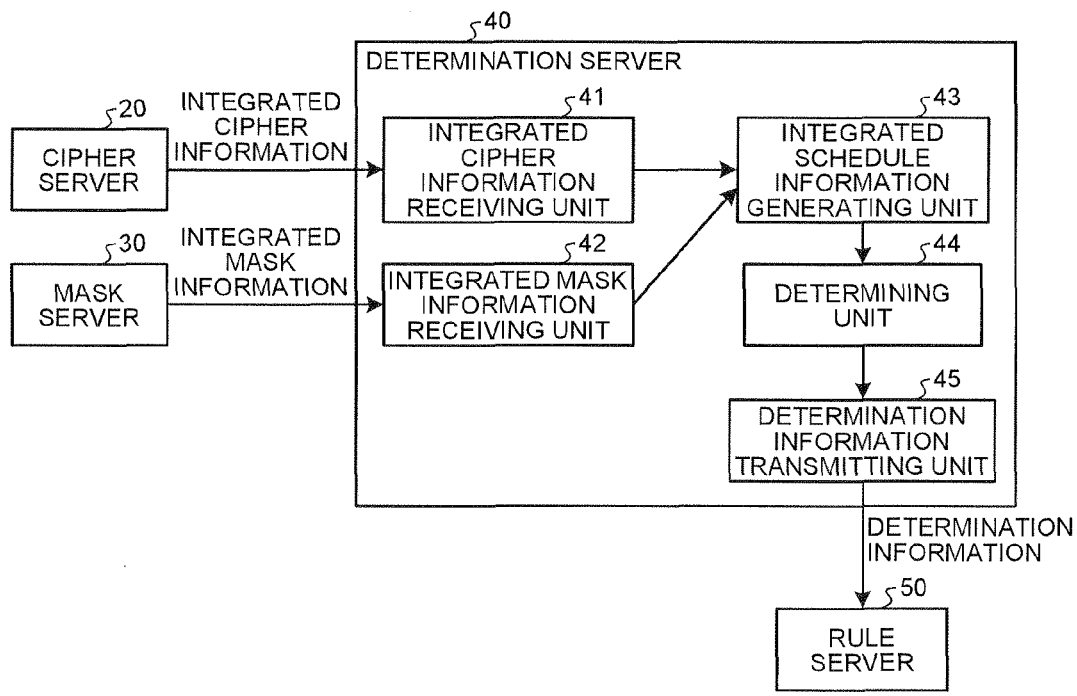
FIG. 9 is a functional block diagram of a determination server according to the embodiment.

FIG. 9 is a functional block diagram illustrating an example of a functional configuration implemented in the determination server 40. The determination server 40 includes an integrated cipher information receiving unit 41, an integrated mask information receiving unit 42, an integrated schedule information generating unit 43, a determining unit 44 and a determination information transmitting unit 45 as illustrated in FIG. 9.

Functions of the integrated schedule information generating unit 43 and the determining unit 44 are implemented by executing programs stored in the auxiliary storage unit by the CPU using the main storage unit, for example. Functions of the integrated cipher information receiving unit 41, the integrated mask information receiving unit 42 and the determination information transmitting unit 45 are implemented by controlling the operation of the communication interfaces by executing programs stored in the auxiliary storage unit by the CPU using the main storage unit, for example.

The integrated cipher information receiving unit 41 receives the integrated cipher information transmitted from the cipher server 20 via the communication network 60.

The integrated mask information receiving unit 42 receives the integrated mask information transmitted from the mask server 30 via the communication network 60.

The integrated schedule information generating unit 43 generates integrated schedule information that is a difference between the integrated cipher information received by the integrated cipher information receiving unit 41 and the integrated mask information received by the integrated mask information receiving unit 42. The integrated schedule information corresponds to information obtained by integrating a plurality of schedule information pieces to which individual adjustment rules are applied. In other words, the integrated cipher information is a sum of results of applying individual adjustment rules to a plurality of cipher information pieces obtained by converting schedule information pieces by mask information pieces. The integrated mask information is a sum of results of applying individual adjustment rules to a plurality of mask information pieces used for generation of a plurality of cipher information pieces. Therefore, a sum of results of applying adjustment rules to the original schedule information pieces can be obtained by obtaining a difference between the integrated cipher information and the integrated mask information.

The determining unit 44 determines whether or not the integrated schedule information generated by the integrated schedule information generating unit 43 satisfies a predetermined control condition. The control condition is a condition for reducing loads on power supply equipment and determined in advance on the basis of the supply capability information (such as distribution of electric power amount per time slot that can be supplied by the power supply equipment) described above. The integrated schedule information is determined not to satisfy the control condition when it is estimated that a time frame at which the sum of power consumption exceeds the electricity power amount that can be supplied will occur or when it is estimated that a time frame at which the sum of power consumption is largely different from a target value set for each time frame will occur as a result of comparison between the integrated schedule information generated by the integrated schedule information generating unit 43 and the supply capability information, for example.

The determination information transmitting unit 45 transmits determination information representing a result of the determination by the determining unit 44, that is, determination information indicating whether or not the integrated schedule information generated by the integrated schedule information generating unit 43 satisfies a predetermined control condition to the rule server 50 via the communication network 60.

Figure 10:
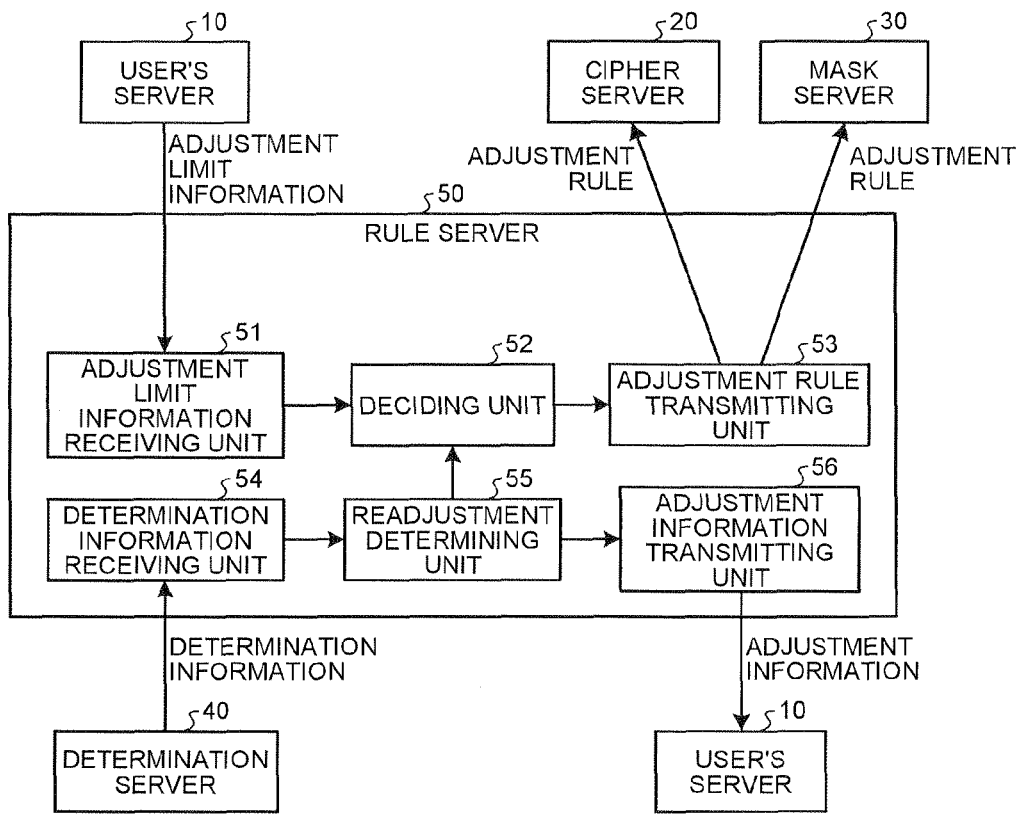
FIG. 10 is a functional block diagram of a rule server according to the embodiment.

FIG. 10 is a functional block diagram illustrating an example of a functional configuration implemented in the rule server 50. The rule server 50 includes an adjustment limit information receiving unit 51, a deciding unit 52, an adjustment rule transmitting unit 53, a determination information receiving unit 54, a readjustment determining unit 55 and an adjustment information transmitting unit 56 as illustrated in FIG. 10.

Functions of the deciding unit 52 and the readjustment determining unit 55 are implemented by executing programs stored in the auxiliary storage unit by the CPU using the main storage unit, for example. Functions of the adjustment limit information receiving unit 51, the adjustment rule transmitting unit 53, the determination information receiving unit 54 and the adjustment information transmitting unit 56 are implemented controlling the operation of the communication interfaces by executing programs stored in the auxiliary storage unit by the CPU using the main storage unit, for example.

The adjustment limit information receiving unit 51 receives each of adjustment limit information pieces transmitted from a plurality of user's servers 10 via the communication network 60.

The deciding unit 52 determines a plurality of adjustment rules to be individually applied to a plurality of schedule information pieces (cipher information pieces and mask information pieces in the embodiment) each associated with each of the users on the basis of respective adjustment limit information pieces received by the adjustment limit information receiving unit 51 from a plurality of user's servers 10. An adjustment rule is either a shift adjustment or an interval adjustment or a combination of the both as described above. The deciding unit 52 determines adjustment rules to shift the power consumption per time frame within a range that does not exceeds the contract ratios or the contract ranges for the respective users by shift adjustment, interval adjustment or a combination of these on the basis of the adjustment limit information received from the user's servers 10.

If it is determined by the readjustment determining unit 55, which will be described later, that the schedule information needs to be readjusted, the deciding unit 52 also changes at least one of the adjustment rules determined previously to determine a plurality of new adjustment rules to be individually applied to a plurality of schedule information pieces (cipher information pieces and mask information pieces in the embodiment). A specific example of a method for determining new adjustment rules when readjustment is needed will be described in detail later.

The adjustment rule transmitting unit 53 transmits a plurality of adjustment rules determined by the deciding unit 52 to the cipher server 20 and the mask server 30 via the communication network 60. In this process, the adjustment rule transmitting unit 53 preferably transmits information unique to each user's server 10 associated with each adjustment rule together with the adjustment rules to the cipher server 20 and the mask server 30 so that the cipher server 20 and the mask server 30 can identify the cipher information or the mask information to be applied for each of the adjustment rules. If it is determined by the readjustment determining unit 55, which will be described later, that the schedule information needs to be readjusted and the deciding unit 52 has determined a plurality of new adjustment rules, the adjustment rule transmitting unit 53 transmits the new adjustment rules determined by the deciding unit 52 to the cipher server 20 and the mask server 30 via the communication network 60.

The determination information receiving unit 54 receives the determination information transmitted by the determination server 40 via the communication network 60.

The readjustment determining unit 55 determines whether or not the schedule information needs to be readjusted on the basis of the determination information received by the determination information receiving unit 54. Specifically, if the determination information receiving unit 54 has received determination information indicating that the integrated schedule information satisfies the control condition, the readjustment determining unit 55 determines that the schedule information does not need to be readjusted. If the determination information receiving unit 54 has received determination information indicating that the integrated schedule information does not satisfy the control condition, on the other hand, the readjustment determining unit 55 determines that the schedule information needs to be readjusted.

If the readjustment determining unit 55 has determined that the schedule information does not need to be readjusted, the adjustment information transmitting unit 56 transmits adjustment information representing the result of the adjustment of the schedule information to the user's servers 10 via the communication network 60. The adjustment information transmitted to the user's servers 10 is adjustment rules for each schedule information pieces finally determined by the deciding unit 52 and contains information requesting a change in the power use time so as to shift power consumption scheduled at a certain time frame to another time frame. Each user's server 10 that has received the adjustment information controls supply of the special power to the user according to the received adjustment information as described above.

As described above, if it is determined by the readjustment determining unit 55 that the schedule information needs to be readjusted, the deciding unit 52 changes at least one of the adjustment rules determined previously to determine a plurality of new adjustment rules. Here, a specific example of a method for determining a plurality of new adjustment rules by the deciding unit 52 will be described.

In the power use adjustment system according to the embodiment, information transmitted from the determination server 40 to the rule server 50 is limited only to the determination information representing a result of the determination by the determining unit 44 so as to keep privacy between the determination server 40 and the rule server 50. For determination of new adjustment rules, therefore, the deciding unit 52 needs to determine new adjustment rules without referring to information as to in what point and to what degree the integrated schedule information for the result to which the adjustment rules determined previously are applied does not satisfy the control condition. It is therefore necessary to define in advance a policy of to which adjustment rule to be shifted next if the integrated schedule information for a result of applying a certain adjustment rule does not satisfy the control condition. In the embodiment, a policy of starting from an adjustment rule with a smaller adjustment amount and gradually changing to adjustment rules with larger adjustment amounts in ascending order of the adjustment amounts is employed as such a policy for determining the adjustment rules. This is a policy of changing the adjustment rules to be applied to the schedule information pieces constituting The integrated schedule information in a direction in which the integrated schedule information becomes more likely to satisfy the control condition.

If the manner of changing the adjustment rules is definite, however, current adjustment rules may be inferred from the number of repetitions of processing for determining the adjustment rules. Therefore, what adjustment rule to start from and how much the next adjustment amount to be changed to is increased in the adjustment amount if the integrated schedule information for a result of applying a certain adjustment rule does not satisfy the control condition (the degree of increase in the adjustment amount) and the like are determined by using random numbers. It only some of a plurality of adjustment rules are to be changed, which ones of the adjustment rules are to be changed may also be determined by using random numbers. As a result of using random numbers in this manner in determination of new adjustment rules, it is difficult to infer the adjustment rules determined by the deciding unit 52 of the rule server 50 at the determination server 40 and the privacy between the determination server 40 and the rule server 50 can be kept in a reliable manner.

Examples of a method for using random numbers for determining adjustment rules include a method of applying a probability distribution in which the probability is increased as the adjustment amount is smaller in common to all the users and determining adjustment rules to be applied to the respective schedule information pieces of the users on the basis of the probability distribution. Alternatively, a method of applying different probability distributions to different users and determining adjustment rules to be applied to the respective schedule information pieces of the users on the basis of the different probability distributions for different users can also be considered. If different probability distributions are applied to different users, adjustment rules can be changed in such a manner that the adjustment amount is preferentially increased for users with larger contract ratios or contract ranges.

As described above, the deciding unit 52 determines an adjustment rule to be applied to the schedule information associated with each user so that the adjustment amount is within a range that does not exceed the contract ratio or the contract range for the user as described above. There may also be assumed, however, a case where the integrated schedule information for results of applying adjustment rules does not satisfy the control condition even if the adjustment rules to be applied to all the schedule information pieces are changed up to the adjustment amounts that are the limits of the contract ratios or the contract ranges for the respective users. In such a case, it is preferable to stop supply of the special power to some users, that is, to invalidate the schedule information pieces associated with some users so as not to include the schedule information pieces in the integrated schedule information thereby making the integrated schedule information satisfy the control condition.

Specifically, supply stop is defined as an adjustment rule with a maximum adjustment amount. In a case where the integrated schedule information for results of applying adjustment rules does not satisfy the control condition even if the adjustment rules to be applied to all the schedule information pieces are changed up to the adjustment amounts that are the limits of the contract ratios or the contract ranges for the respective users, the deciding unit 52 changes the adjustment rules to be applied to at least some of use information pieces to supply stop. When an adjustment rule of supply stop is applied to a certain cipher information piece, the cipher server 20 obtains a sum of the other cipher information pieces excluding this cipher information piece for generation of the integrated cipher information. Similarly, when an adjustment rule of supply stop is applied to a certain mask information piece, the mask server 30 obtains a sum of the other mask information pieces excluding this mask information piece for generation of the integrated mask information. The determination server 40 then generates a difference between the integrated cipher information that does not contain the cipher information piece to which the adjustment rule of supply stop is applied and the integrated mask information that does not contain the mask information piece to which the adjustment rule of supply stop is applied as the integrated schedule information and determines whether or not the integrated schedule information satisfies the control condition.

As described above, since supply of the normal power is maintained even when supply of the special power to some users is stopped, the users may use the normal power for applications that require stable power supply. Such supply stop of the special power may be defined as a special agreement on possible occurrence of supply stop of the special power regardless of the contract ratio or the contract range in the contract between the utility company and each user.

The utility company manages and operates the power supply equipment so that a situation in which the control condition described above is not satisfied is avoided as much as possible on the basis of the contract ratios or the contract ranges with the users. Therefore, in many cases excluding cases of special circumstances such as occurrence of unforeseen circumstances in the power supply equipment, the integrated schedule information for results of applying adjustment rules will satisfy the control condition before changing the adjustment rules to be applied to all the schedule information pieces up to the adjustment amounts that are the limits of the contract ratios or the contract ranges for the respective users.

Principle of Privacy Protection Method

Next, the principle of the privacy protection method according to the embodiment will be described with reference to FIGS. 11 to 17. In order to simplify the description of the principle of the privacy protection method according to the embodiment, an example in which only use information of two user's servers (hereinafter, one user's server will be represented by α and the other user's server will be represented by β) is to be adjusted will be described.

Figure 11:
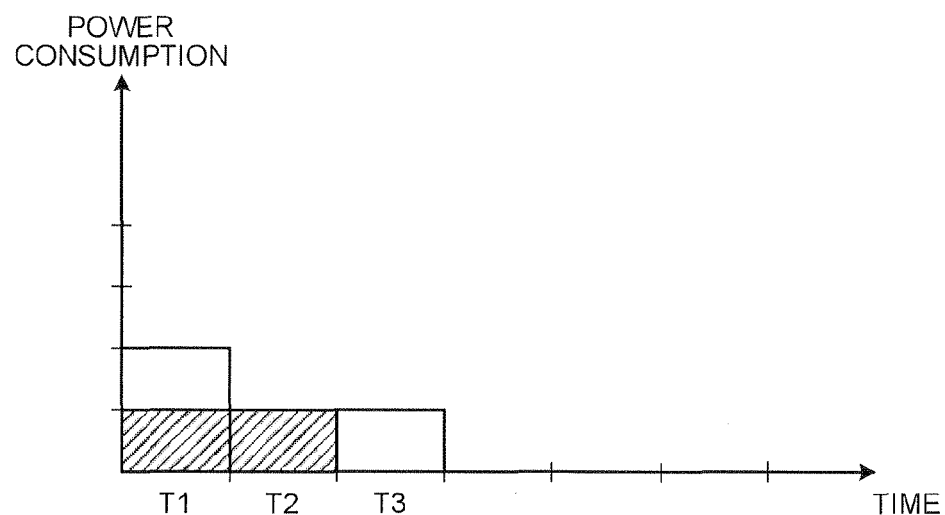
FIG. 11 is a conceptual graph of cipher information generated by a user's server $\alpha$.
Figure 12:
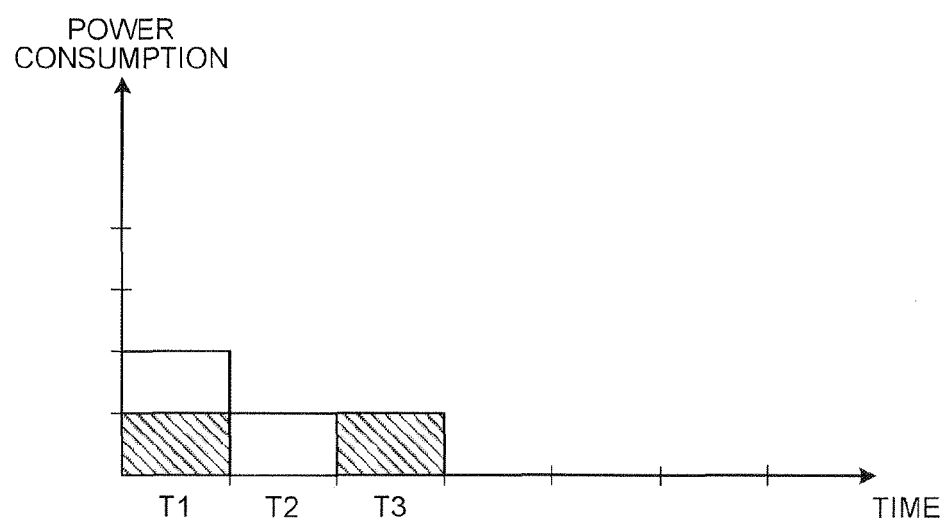
FIG. 12 is a conceptual graph of cipher information generated by a user's server $\beta$.

FIG. 11 is a conceptual diagram expressing cipher information generated by the user's server α in a form of a graph as in FIG. 1, and FIG. 12 is a conceptual diagram expressing cipher information generated by the user's server β in a form of a graph as in FIG. 1. Hatched blocks in the drawings represent power consumption per time frame in original schedule information, and white blocks correspond to mask information.

The schedule information stored in the user's server α indicates that power consumption corresponding to one block is scheduled at each of time frames T1 and T2 as illustrated in FIG. 11. Then, as a result of masking the schedule information with mask information, the schedule information is encrypted into cipher information in which power consumption corresponding to two blocks is scheduled at the time frame T1, power consumption corresponding to one block is scheduled at the time frame T2 and power consumption corresponding to one block is scheduled at a time frame T3, which is different from the original schedule information. As a result of masking the schedule information of the user's server α with the mask information in this manner, the schedule information of the user's server α is hidden.

The user's server α transmits the cipher information obtained by hiding the original schedule information with the mask information in this manner to the cipher server 20. The user's server α also transmits the mask information that is a difference between the cipher information transmitted to the cipher server 20 and the original schedule information to the mask server 30. The mask information transmitted from the user's server α to the mask server 30 is information representing power consumption corresponding to one block at the time frame T1 and power consumption corresponding to one block at the time frame T3 as illustrated in FIG. 11.

On the other hand, the schedule information stored in the user's server β indicates that power consumption corresponding to one block is scheduled at each of time frames T1 and T3 as illustrated in FIG. 12. Then, as a result of masking the schedule information with mask information, the schedule information is encrypted into cipher information in which power consumption corresponding to two blocks is scheduled at the time frame T1, power consumption corresponding to one block is scheduled at the time frame T2 and power consumption corresponding to one block is scheduled at a time frame T3, which is different from the original schedule information. As a result of masking the schedule information of the user's server β with the mask information in this manner, the schedule information of the user's server β is hidden.

The user's server β transmits the cipher information obtained by hiding the original schedule information with the mask information in this manner to the cipher server 20. The user's server β also transmits the mask information that is a difference between the cipher information transmitted to the cipher server 20 and the original schedule information to the mask server 30. The mask information transmitted from the user's server β to the mask server 30 is information representing power consumption corresponding to one block at the time frame T1 and power consumption corresponding to one block at the time frame T2 as illustrated in FIG. 12.

Figure 13:
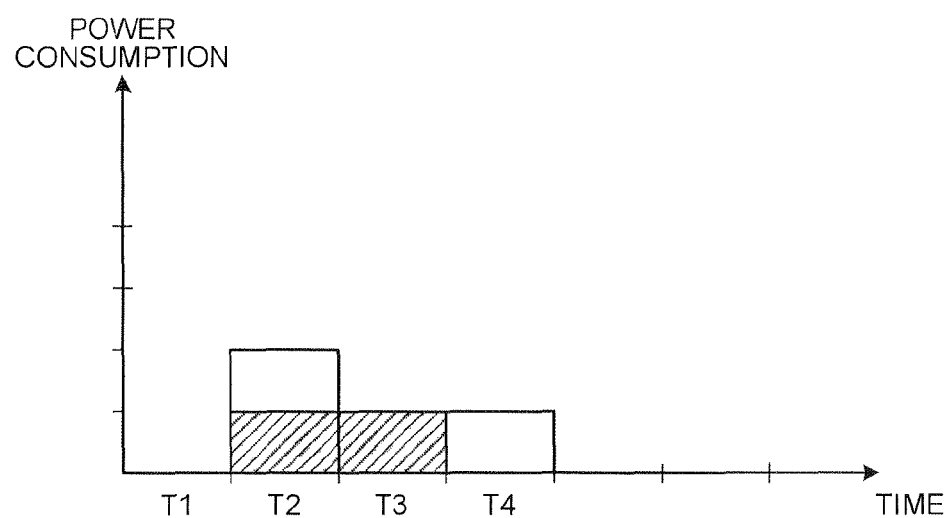
FIG. 13 is a conceptual graph of a case in which the cipher information of FIG. 11 is subjected to shift adjustment.

FIG. 13 is a conceptual graph of a case where an adjustment rule of a shift by 1 to the right is applied to the cipher information illustrated in FIG. 11. When the adjustment rule of a shift by 1 to the right is applied to the cipher information illustrated in FIG. 11, the power consumption corresponding to two blocks at the time frame T1 is shifted to the time frame T2, the power consumption corresponding to one block at the time frame T2 is shifted to the time frame 13 and the power consumption corresponding to one block at the time frame T3 is shifted to a time frame T4 as illustrated in FIG. 13.

Figure 14:
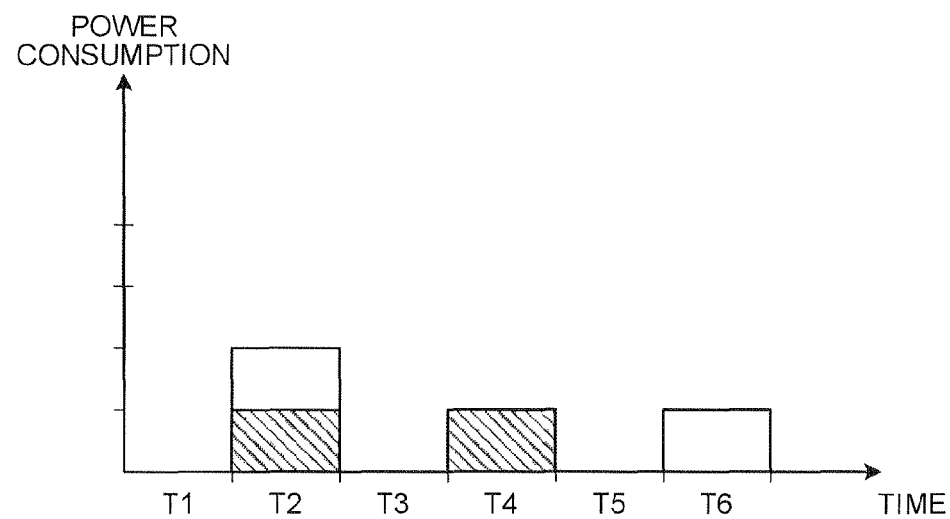
FIG. 14 is a conceptual graph of a case in which the cipher information of FIG. 12 is subjected to interval adjustment.

FIG. 14 is a conceptual graph of a case where an adjustment rule of an interval increase by 1 is applied to the cipher information illustrated in FIG. 12. When the adjustment rule of an interval increase by 1 is applied to the cipher information illustrated in FIG. 12, the power consumption corresponding to two blocks at the time frame T1 is shifted to the time frame T2, the power consumption corresponding to one block at the time frame T2 is shifted to a time frame T4, the power consumption corresponding to one block at the time frame T3 is shifted to a time frame T6 and the power consumption at time frames T1, T3 and T5 becomes zero as illustrated in FIG. 14.

Figure 15:
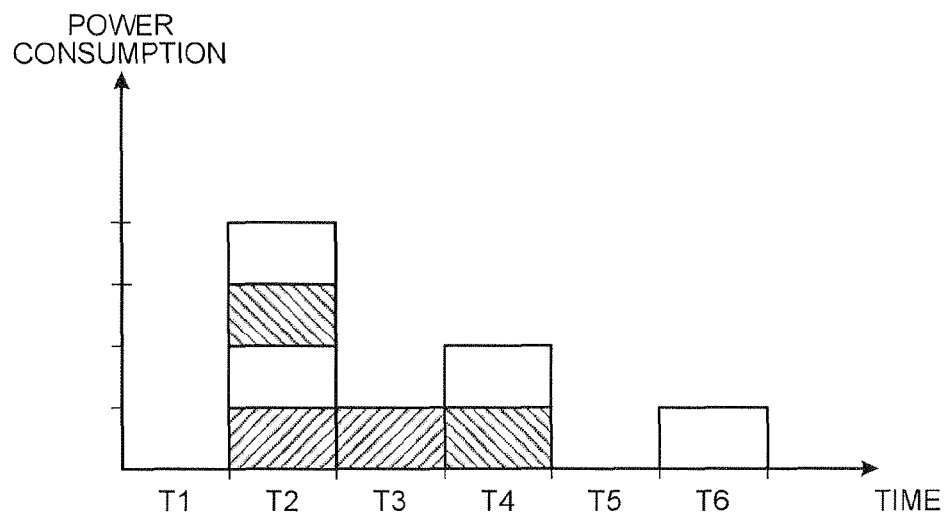
FIG. 15 is a conceptual graph illustrating an example of integrated cipher information.

FIG. 15 is a conceptual graph of integrated cipher information obtained by integrating the adjusted cipher information illustrated in FIG. 13 and the adjusted cipher information illustrated in FIG. 14. As a result of integrating the adjusted cipher information illustrated in FIG. 13 and the adjusted cipher information illustrated in FIG. 14, integrated cipher information indicating that power consumption corresponding to four blocks is scheduled at the time frame T2, power consumption corresponding to one block is scheduled at the time frame T3, power consumption corresponding to two blocks is scheduled at the time frame T4 and power consumption corresponding to one block is scheduled at the time frame T6 can be obtained as illustrated in FIG. 15.

The cipher server 20 receives the cipher information illustrated in FIG. 11 from the user's server α, receives the cipher information illustrated in FIG. 12 from the user's server β, and receives a shift by 1 to the right as an adjustment rule to be applied to the cipher information of the user's server α and an interval increase by 1 as an adjustment rule to be applied to the cipher information of the user's server β from the rule server 50. In this case, the cipher server 20 applies the adjustment rule of a shift by 1 to the right to the cipher information illustrated in FIG. 11 received from the user's server α to generate the adjusted cipher information illustrated in FIG. 13, and applies the adjustment rule of an interval increase by 1 to the cipher information illustrated in FIG. 12 received from the user's server β to generate the adjusted cipher information illustrated in FIG. 14. The cipher server 20 then integrates the adjusted cipher information illustrated in FIG. 13 and the adjusted cipher information illustrated in FIG. 14 to generate the integrated cipher information illustrated in FIG. 15, and transmits the generated integrated cipher information to the determination server 40.

Figure 16:
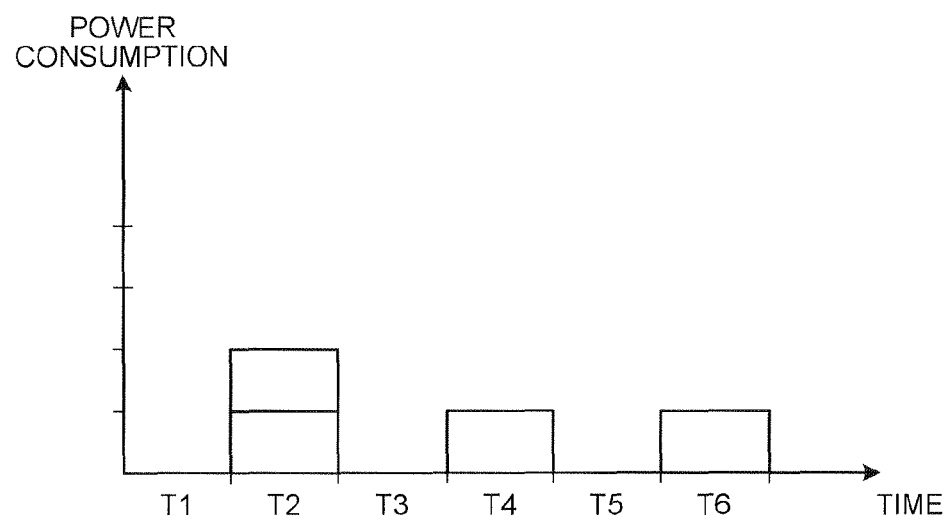
FIG. 16 is a conceptual graph illustrating an example of integrated mask information.

FIG. 16 is a conceptual graph of integrated mask information obtained by integrating a result of applying the adjustment rule of a shift by 1 to the right to the mask information transmitted from the user's server α and a result of applying the adjustment rule of an interval increase by 1 to the mask information transmitted from the user's server β. As a result of integrating the result of applying the adjustment rule of a shift by 1 to the right to the mask information transmitted from the user's server α and the result of applying the adjustment rule of an interval increase by 1 to the mask information transmitted from the user's server β, integrated mask information indicating that power consumption corresponding to two blocks is scheduled at the time frame T2, power consumption corresponding to one block is scheduled at the time frame T4 and power consumption corresponding to one block is scheduled at the time frame T6 can be obtained as illustrated in FIG. 16.

The mask server 30 receives mask information from each of the user's server α and the user's server β, and receives a shift by 1 to the right as the adjustment rule to be applied to the mask information of the user's server α and an interval increase by 1 as the adjustment rule to be applied to the mask information of the user's server β from the rule server 50. In this case, the mask server 30 applies the adjustment rule of a shift by 1 to the right to the mask information received from the user's server α to generate adjusted mask information, and applies the adjustment rule of an interval increase by 1 to the mask information received from the user's server β to generate adjusted mask information. The mask server 30 then integrates the adjusted mask information pieces to generate the integrated mask information illustrated in FIG. 16 and transmits the generated integrated mask information to the determination server 40.

Figure 17:
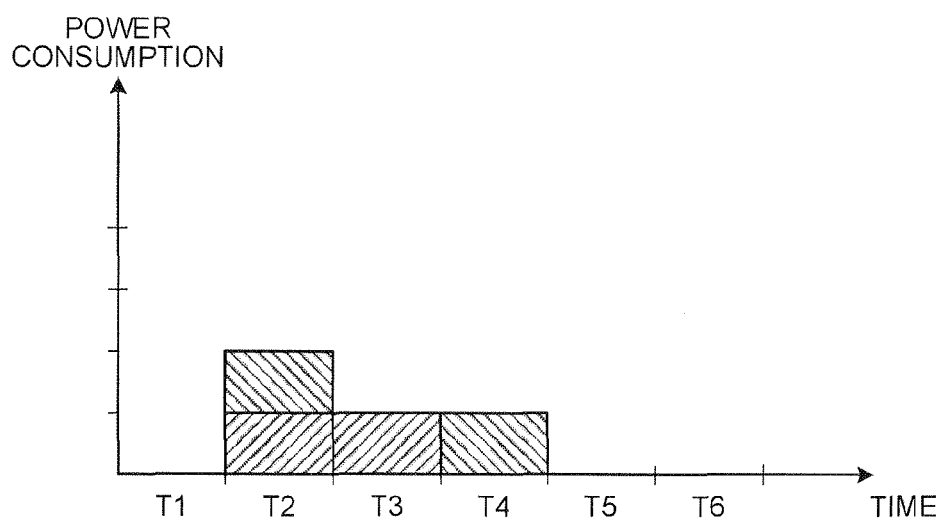
FIG. 17 is a conceptual graph illustrating an example of integrated schedule information.

FIG. 17 is a conceptual graph of integrated schedule information obtained as a difference between the integrated cipher information illustrated in FIG. 15 and the integrated mask information illustrated in FIG. 16. As a result of obtaining a difference between the integrated cipher information illustrated in FIG. 15 and the integrated mask information illustrated in FIG. 16, the integrated schedule information indicating that power consumption corresponding to two blocks is scheduled at the time frame T2, power consumption corresponding to one block is scheduled at the time frame T3 and power consumption corresponding to one block is scheduled at the time frame T4 can be obtained as illustrated in FIG. 17. The integrated schedule information illustrated in FIG. 17 is coincident with a sum of the result of applying the adjustment rule of a shift by 1 to the right to the schedule information stored in the user's server α and the result of applying the adjustment rule of an interval increase by 1 to the schedule information stored in the user's server β.

The determination server 40 receives the integrated cipher information illustrated in FIG. 15 from the cipher server 20 and receives the integrated mask information illustrated in FIG. 16 from the mask server 30. In this case, the determination server 40 obtains a difference between the integrated cipher information illustrated in FIG. 15 and the integrated mask information illustrated in FIG. 16 to generate the integrated schedule information illustrated in FIG. 17. The determination server 40 then determines whether or not the generated integrated schedule information satisfies a predetermined control condition, and transmits determination information representing a result of the determination to the rule server 50.

The rule server 50 receives the determination information from the determination server 40. If the determination information received from the determination server 40 indicates that the integrated schedule information illustrated in FIG. 17 does not satisfy the control condition, the rule server 50 then changes at least one of the adjustment rule to be applied to the schedule information of the user's server α and the adjustment rule to be applied to the schedule information of the user's server β and transmits new adjustment rules to the cipher server 20 and the mask server 30. If the determination information received from the determination server 40 indicates that the integrated schedule information illustrated in FIG. 17 satisfies the control condition, on the other hand, the rule server 50 transmits the adjustment rule applied to the schedule information of the user's server α, that is the adjustment rule of a shift by 1 to the right, as the adjustment information to the user's server α, and transmits the adjustment rule applied to the schedule information of the user's server β, that is the adjustment rule of an interval increase by 1, as the adjustment information to the user's server β.

As described above, in the power use adjustment system according to the embodiment, respective schedule information pieces of users stored in a plurality of user's servers 10 are collected by the cipher server 20 as cipher information pieces obtained by encrypting the respective schedule information pieces with masks. In addition, mask information pieces used for the encryption of the respective schedule information pieces are collected by the mask server 30. Then, the integrated cipher information obtained by integrating the results of applying individual adjustment rules determined by the rule server 50 to the respective cipher information pieces is generated by the cipher server 20 and transmitted to the determination server 40. In addition, the integrated mask information obtained by integrating the results of applying individual adjustment rules determined by the rule server 50 to the respective mask information pieces is generated by the mask server 30 and transmitted to the determination server 40.

Thereafter, the integrated schedule information that is a difference between the integrated cipher information and the integrated mask information is generated, it is determined whether or not the integrated schedule information satisfies the predetermined control condition, and determination information representing the result of the determination is transmitted to the rule server 50 by the determination server 40. If the integrated schedule information does not satisfy the control condition, at least one of a plurality of adjustment rules is changed and new adjustment rules containing the changed adjustment rule are transmitted to the cipher server 20 and the mask server 30 by the rule server 50, and the generation of the integrated cipher information, the generation of the integrated mask information, the generation of the integrated schedule information and the determination as to whether the integrated schedule information satisfies the control condition are repeated. If the integrated schedule information satisfies the control condition, on the other hand, the adjustment rules applied at this point are transmitted as the adjustment information from the rule server 50 to associated user's servers 10. Then, control on supply of the special power based on the adjustment information is performed by each user's server 10.

As described above, the power use adjustment system according to the embodiment allows desired adjustment to be made on the schedule information of each user so that loads on the power supply equipment are reduced without disclosing the schedule information itself of each user and thus allows adjustment of power use while protecting the privacy of the users. In particular, since the function of applying adjustment rules to cipher information obtained by encrypting use information and integrating the cipher information pieces, the function of applying adjustment rules to mask information used for the encryption of the use information and integrating the mask information pieces, the function of generating integrated schedule information from the integrated cipher information and the integrated mask information and determining whether or not the integrated schedule information satisfies a control condition, and the function of determining the adjustment rules to be applied to the cipher information and the mask information are distributed to four servers (the cipher server 20, the mask server 30, the determination server 40 and the rule server 50) that are physically separated from one another in the power use adjustment system according to the embodiment, it is difficult to infer the use information even if any one server is attacked and the use information is thus kept in high privacy.

For example, it is assumed here that the rule server 50 is attacked and the attacker has decided adjustment rules that are advantageous in inferring the use information. The information received by the rule server 50, however, is only the determination information indicating whether or not the integrated schedule information for the results of applying the adjustment rules, and the individual schedule information pieces therefore cannot be inferred from the decided adjustment rules. Alternatively, for example, it is assumed that the determination server 40 is attacked and the integrated schedule information has leaked out. The integrated schedule information generated by the determination server 40, however, is obtained by integrating the results of applying individual adjustment rules to the respective use information pieces, the adjustment rules individually applied to the respective use information pieces are determined by the rule server 50 and transmitted only to the cipher server 20 and the mask server 30, and therefore the individual schedule information pieces cannot be inferred from the integrated schedule information.

Generalization with Encryption Using Additive Homomorphic Function

The privacy protection method according to the embodiment described above can be generalized as follows by using an additive homomorphic function in the encryption of schedule information. While the following description will be made assuming that adjustment rules are not applied to cipher information and mask information so as to simplify the description, the following description will also hold true in a case where adjustment rules are applied to cipher information and mask information on the assumption that the same adjustment rule is applied to the cipher information and the mask information for the same schedule information as in the embodiment.

A function for encrypting schedule information by a user's server 10 is represented by $\psi(\ )$ and it is assumed that $\psi(\ )$ is an additive homomorphic function. In other words, it is assumed that $\psi(P_1)+\psi(P_2)=\psi(P_1+P_2)$ is satisfied.

When schedule information stored by a certain user's server j is represented by Pj, a cipher obtained by encrypting the schedule information Pj with the additive homomorphic function $\psi(\ )$ is $\psi(P_j)$. Information corresponding to a change resulting from the encryption (that is, mask information) is $\psi(P_1)-P_j$, which is represented by $\xi(P_j)$. Then, $\xi(P_1+P_2)=\psi(P_1+P_2)-(P_1+P_2)=\psi(P_1)+\psi(P_2)-P_1-P_2=\xi(P_1)+\xi(P_2)$ is satisfied.

When schedule information pieces stored by a plurality of user's servers 10, respectively, are represented by $P_1, P_2, \ldots, P_1$, the integrated cipher information generated by the cipher server 20 will be $\psi(P_1)+\psi(P_2)+ \ldots +\psi(P_1)=\psi(P_1+P_2+ \ldots +P_1)$. In addition, the integrated mask information generated by the mask server 30 will be $\xi(P_1)+\xi(P_2)+ \ldots +\xi(P_1)=\xi(P_1+P_2+ \ldots +P_1)$. Accordingly, the integrated schedule information that the determination server 40 obtains from a difference between the integrated cipher information and the integrated mask information will be $\psi(P_1+P_2+ \ldots +P_1)-\xi(P_1+P_2+ \ldots +P_1)=P_1+P_2+ \ldots +P_1$, which is coincident with the sum of $P_1, P_2, \ldots, P_1$ generated by the respective user's servers 10.

Application to Smart Grid

Next, a specific example of a case where the power use adjustment system according to the embodiment is applied to a smart grid will be described. The power use adjustment system according to the embodiment includes components of the user's servers 10, the cipher server 20, the mask server 30, the determination server 40 and the rule server 50 as described above. In a framework of a smart grid, on the other hand, a community energy management system (CEMS), a building energy management system (BEMS), a home energy management system (HEMS), and components intermediate thereof are present.

When the power use adjustment system according to the embodiment is applied to a smart grid, an example of application in which the user's servers 10 correspond to the HEMSs, the determination server 40 corresponds to the CEMS, and the cipher server 20, the mask server 30 and the rule server 50 correspond to components intermediate of the CEMS and the HEMS can be considered as a first example. Alternatively, an example of application in which the user's servers 10 correspond to the BEMSs, the determination server 40 corresponds to the CEMS, and the cipher server 20, the mask server 30 and the rule server 50 correspond to integrated BEMSs that manage a plurality of BEMS in an integrated manner can be considered as a second example. Still alternatively, an example of application in which the user's servers 10 correspond to servers that manage tenants of buildings, the determination server 40 corresponds to the integrated BEMS, and the cipher server 20, the mask server 30 and the rule server 50 correspond to the BEMSs can be considered as a third example.

Advantageous Effects of Embodiment

As described above in detail with reference to specific examples, according to the power use adjustment system according to the embodiment, it is possible to adjust power use by users so that loads on power supply equipment are reduced by protecting the privacy of the users.

A technique disclosed in Non Patent Literature 1 is known as a technique for controlling power supply taking power use schedule of users into consideration. In the technique disclosed in Non Patent Literature 1, however, protection of the privacy of users is not assumed and no mechanism for protecting the privacy of users is considered. Moreover, power supply control to which the technique disclosed in Non Patent Literature 1 is applied will be control that wastefully limits the power supply according to the schedules of power use by users. In contrast, the power use adjustment system according to the embodiment is a system that compensates for electric power amount corresponding to limited power use of users at a certain time slot with power supply at another time slot and requests the users to complementarily adjust power use at a plurality of time points. Since the system requests the users to limit power use while ensuring supply of necessary electric power amount, it is possible to realize a highly convenient demand response.

Note that the user's servers 10, the cipher server 20, the mask server 30, the determination server 40 and the rule server 50 constituting the power use adjustment system according to the embodiment can implement some or all of the functional configurations described above by programs executed by computers constituting the servers.

Power use adjustment programs to be executed by the user's servers 10, the cipher server 20, the mask server 30, the determination server 40 and the rule server 50 are recorded on a computer readable recording medium such as a CD-ROM, a flexible disk (FD), a CD-R and a digital versatile disk (DVD) in a form of a file that can be installed or executed, and provided therefrom, for example.

Alternatively, the programs to be executed by the user's servers 10, the cipher server 20, the mask server 30, the determination server 40 and the rule server 50 may be stored on a computer system connected to a network such as the Internet, and provided by being downloaded via the network. Still alternatively, the programs to be executed by the user's servers 10, the cipher server 20, the mask server 30, the determination server 40 and the rule server 50 may be provided or distributed through a network such as the Internet. Still alternatively, the programs to be executed by the user's servers 10, the cipher server 20, the mask server 30, the determination server 40 and the rule server 50 may be embedded on a ROM or the like in advance and provided therefrom.

The programs to be executed by the user's servers 10, the cipher server 20, the mask server 30, the determination server 40 and the rule server 50 have modular structures including some or all of the functional configurations described above. In an actual hardware configuration, the CPU (processor) reads the programs from the recording medium mentioned above and executes the programs, whereby some or all of the functional configurations described above are loaded on a main storage device and generated thereon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device connected to a plurality of first external devices, a second external device, a third external device and a fourth external device, wherein the first external devices store therein schedule information pieces of power use of respective users, transmit converted information pieces obtained by converting the schedule information pieces to the second external device, and transmit difference information pieces that are differences between the converted information pieces and the schedule information pieces to the third external device, the second external device transmits integrated converted information that is a sum of a plurality of converted information pieces adjusted according to a plurality of adjustment rules, respectively, to the fourth external device, the third external device transmits integrated difference information that is a sum of a plurality of difference information pieces adjusted according to the adjustment rules, respectively, to the fourth external device, and the fourth external device determines whether or not integrated schedule information that is a difference between the integrated converted information and the integrated difference information satisfies a predetermined condition, the information processing device comprising:

a first receiving unit configured to receive, from each of the first external devices, adjustment limit information representing a range within which the schedule information can be adjusted;

a deciding unit configured to determine the adjustment rules to be individually applied to the schedule information pieces on a basis of the adjustment limit information;

a first transmitting unit configured to transmit the adjustment rules to the second external device and the third external device;

a second receiving unit configured to receive determination information representing a result of the determination from the fourth external device; and a second transmitting unit configured to transmit the adjustment rules, which have been transmitted to the second external device and the third external device, to the first external devices upon receipt of the determination information indicating that the integrated schedule information satisfies the condition, wherein the deciding unit changes at least one of the adjustment rules upon receipt of the determination information indicating that the integrated schedule information does not satisfy the condition, and when the deciding unit has changed at least one of the adjustment rules, the first transmitting unit transmits new adjustment rules including the changed adjustment rule to the second external device and the third external device.

2. The device according to claim 1, wherein upon receipt of the determination information indicating that the integrated schedule information does not satisfy the condition, the deciding unit changes at least one of the adjustment rules so that an adjustment amount in the schedule information piece is increased within an adjustable range indicated by the adjustment limit information.

3. The device according to claim 2, wherein the deciding unit determines a degree of increase in the adjustment amount by using random numbers.

4. The device according to claim 2, wherein the deciding unit determines the adjustment rule to be changed among the adjustment rules by using random numbers.

5. The device according to claim 1, wherein the schedule information piece represents power consumption scheduled at each time slot, and the adjustment rule is either of a shift adjustment of shifting power consumption scheduled at one time slot to another time slot and an interval adjustment of inserting a time slot at which power consumption is zero between two time slots or a combination of the shift adjustment and the interval adjustment.

6. The device according to claim 1, wherein
the converted information pieces are information pieces obtained by converting the schedule information pieces according to predetermined conversion rules, and
the conversion rules are rules according to which a sum of the converted information pieces obtained by converting the schedule information pieces, respectively, and the converted information obtained by converting a sum of the schedule information pieces are coincident with each other.

7. The device according to claim 6, wherein the converted information is information obtained by encrypting the schedule information pieces by an additive homomorphic function.

8. A power use adjustment system comprising:
a plurality of first information processing devices;
a second information processing device connected to the first information processing devices;
a third information processing device connected to the first information processing devices;
a fourth information processing device connected to the second information processing device and the third information processing device; and
a fifth information processing device connected to the first information processing devices, the second information processing device, the third information processing device and the fourth information processing device, wherein
each of the first information processing devices includes:
a storage unit configured to store therein a schedule information piece of power use of each user;
a converted information transmitting unit configured to transmit a converted information piece obtained by converting the schedule information piece to the second information processing device;
a difference information transmitting unit configured to transmit a difference information piece representing a difference between the converted information piece and the schedule information piece to the third information processing device;
an adjustment limit information transmitting unit configured to transmit adjustment limit information representing an adjustable range of the schedule information piece to the fifth information processing device; and
an adjustment information receiving unit configured to receive adjustment information representing a result of adjustment of the schedule information piece from the fifth information processing device,
the second information processing device includes:
a converted information receiving unit configured to receive a plurality of converted information pieces from the first information processing devices;
a first adjustment rule receiving unit configured to receive a plurality of adjustment rules to be individually applied to a plurality of schedule information pieces from the fifth information processing device; and
an integrated converted information transmitting unit configured to transmit integrated converted information that is a sum of the converted information pieces adjusted according to the received adjustment rules, respectively, to the fourth information processing device,
the third information processing device includes:
a difference information receiving unit configured to receive a plurality of difference information pieces from the first information processing devices;
a second adjustment rule receiving unit configured to receive the plurality of adjustment rules from the fifth information processing device; and
an integrated difference information transmitting unit configured to transmit integrated difference information that is a sum of the difference information pieces adjusted according to the received adjustment rules, respectively, to the fourth information processing device,
the fourth information processing device includes:
an integrated converted information receiving unit configured to receive the integrated converted information from the second information processing device;
an integrated difference information receiving unit configured to receive the integrated difference information from the third information processing device;
a determining unit configured to determine whether or not integrated schedule information that is a difference between the integrated converted information and the integrated difference information satisfies a predetermined condition; and
a determination information transmitting unit configured to transmit determination information representing a result of the determination to the fifth information processing device, and
the fifth information processing device includes:
an adjustment limit information receiving unit configured to receive the adjustment limit information from the first information processing devices;
a deciding unit configured to determine the plurality of adjustment rules on a basis of the adjustment limit information;
an adjustment rule transmitting unit configured to transmit the adjustment rules to the second information processing device and the third information processing device; and
a determination information receiving unit configured to receive the determination information from the fourth information processing device; and
an adjustment information transmitting unit configured to transmit the adjustment rules, which have been transmitted to the second information processing device and the third information processing device, as the adjustment information to the first information processing devices upon receipt of the determination information indicating that the integrated schedule information satisfies the condition,
the deciding unit changes at least one of the adjustment rules upon receipt of the determination information indicating that the integrated schedule information does not satisfy the condition, and
when the deciding unit has changed at least one of the adjustment rules, the adjustment rule transmitting unit transmits new adjustment rules including the changed adjustment rule to the second information processing device and the third information processing device.

9. An information processing device connected to a second external device, a third external device, and a fourth external device being connected to a plurality of first external devices, wherein
the first external devices store therein schedule information pieces of power use of respective users, transmit converted information pieces obtained by converting the schedule information pieces to the second external device, and transmit difference information pieces that are differences between the converted information pieces and the schedule information pieces to the third external device, the second external device transmits integrated converted information that is a sum of a plurality of converted information pieces adjusted according to a plurality of adjustment rules, respectively, to the information processing device, the third external device transmits integrated difference information that is a sum of a plurality of difference information pieces adjusted according to the adjustment rules, respectively, to the information processing device, and the fourth external device determines a plurality of adjustment rules to be individually applied to the schedule information pieces on a basis of adjustment limit information representing adjustable ranges of the schedule information pieces and transmits the adjustment rules to the second external device and the third external device, the information processing device comprising:

a first receiving unit configured to receive the integrated converted information from the second external device;

a second receiving unit configured to receive the integrated difference information from the third external device;

a determining unit configured to determine whether or not integrated schedule information that is a difference between the integrated converted information and the integrated difference information satisfies a predetermined condition; and a determination information transmitting unit configured to transmit determination information representing a result of the determination to the fourth external device.

* * * * *